(12) United States Patent
Courtney et al.

(10) Patent No.: US 11,928,461 B2
(45) Date of Patent: Mar. 12, 2024

(54) SOFTWARE UTILIZATION OPTIMIZATION IN MANAGED NETWORKS

(71) Applicant: Ivanti, Inc., South Jordan, UT (US)

(72) Inventors: Terry Courtney, Bristol (GB); David Edgar, Farnham (GB); Vida Sirmeniene, Reading (GB); Simon Oldfield, Oxford (GB)

(73) Assignee: Ivanti, Inc., South Jordan, UT (US)

( * ) Notice: Subject to any disclaimer, the term of this patent is extended or adjusted under 35 U.S.C. 154(b) by 111 days.

(21) Appl. No.: 17/573,531

(22) Filed: Jan. 11, 2022

(65) Prior Publication Data

US 2022/0222067 A1    Jul. 14, 2022

Related U.S. Application Data

(60) Provisional application No. 63/136,020, filed on Jan. 11, 2021.

(51) Int. Cl.
*G06F 8/60* (2018.01)
*G06F 8/61* (2018.01)
*G06F 8/70* (2018.01)

(52) U.S. Cl.
CPC . *G06F 8/70* (2013.01); *G06F 8/62* (2013.01)

(58) Field of Classification Search
CPC ............... G06F 11/302; G06F 11/3055; G06F 11/3433; G06F 11/3409; G06F 11/3438; G06F 11/3466; G06F 11/3476; G06F 2201/81; G06F 2201/865; G06F 8/70; G06F 8/62; G06F 8/71
See application file for complete search history.

(56) References Cited

U.S. PATENT DOCUMENTS

| | | | |
|---|---|---|---|
| 8,341,637 B2 * | 12/2012 | Corry .................. | G06F 11/3409 713/340 |
| 2013/0047039 A1 * | 2/2013 | Manes ................ | G06F 11/3466 714/47.1 |
| 2015/0312422 A1 * | 10/2015 | Leemet ................ | H04L 43/065 455/406 |
| 2018/0276404 A1 * | 9/2018 | Dotan-Cohen ..... | G06F 21/6245 |
| 2018/0341865 A1 * | 11/2018 | Lu ............................. | G06F 8/61 |
| 2020/0394053 A1 * | 12/2020 | Jain .......................... | G06F 8/65 |

\* cited by examiner

*Primary Examiner* — Hanh Thi-Minh Bui

(57) ABSTRACT

An embodiment includes a method of software utilization evaluation in a managed network. The method includes receiving a software parameter for a software implemented by a managed device in a managed network. The method includes obtaining status data of the software on the device. The status data indicating whether the software is in use at the device at a time. The method includes aggregating the status data to determine a software usage of the software at the device. Responsive to the software usage being below a usage threshold, the method includes generating software management action. The usage threshold being based on the software parameter. Responsive to a state at a management device, the method includes implementing the software management action to remotely modify at least one aspect of the managed device.

18 Claims, 7 Drawing Sheets und the following detailed description are exemplary and explanatory and are not restrictive of the invention, as claimed.

SOFTWARE UTILIZATION OPTIMIZATION IN MANAGED NETWORKS

CROSS-REFERENCE TO RELATED APPLICATION

This application claims priority to and the benefit of U.S. Provisional Application No. 63/136,020, filed Jan. 11, 2021, which is incorporated herein by reference in its entirety.

FIELD

The embodiments discussed in this disclosure are related to software application management in managed networks, and in particular to systems and methods of software utilization optimization in the managed networks.

BACKGROUND

As the amount of software as a service (SAAS) applications and software subscriptions increase, management of software applications at computing devices becomes more difficult. This is especially true in managed networks that may be implemented by an enterprise to control and manage endpoint devices. The enterprises may have multiple types of employment and multiple, various types of devices that are managed.

One aspect of the difficulty associated with software management in managed networks is determination of software usage. For instance, such determination may involve an administrator logging into vendor-specific portals to access vendor information regarding software utilization. Due to the lack of transparency, the enterprise may maintain licenses for former employees, maintain licenses for software applications that are not being utilized, or enable software that introduces vulnerabilities to the managed network.

The subject matter claimed herein is not limited to embodiments that solve any disadvantages or that operate only in environments such as those described. Rather, this background is only provided to illustrate one example technology area where some embodiments described herein may be practiced.

SUMMARY

An aspect of an embodiment includes a method of software utilization evaluation in a managed network. The method may include receiving a software parameter for a software implemented by a managed device in a managed network. The method may include obtaining status data of the software on the device. The status data may indicate whether the software is in use at the device at a time. The method may include aggregating the status data to determine a software usage of the software at the device. Responsive to the software usage being below a usage threshold, the method may include generating software management action. The usage threshold may be based on the software parameter. Responsive to a state at a management device, the method may include implementing the software management action to remotely modify at least one aspect of the managed device.

The object and advantages of the embodiments will be realized and achieved at least by the elements, features, and combinations particularly pointed out in the claims. It is to be understood that both the foregoing general description

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

The embodiments discussed in this disclosure are related to software application management in managed networks, and in particular to systems and methods of software utilization optimization in the managed networks. Some embodiments provide operations through which a use status of software applications may be obtained and analyzed. These and other embodiments may enable automated actions that notify administrators of inefficiencies or vulnerabilities, cure deficiencies, and enable forecasting of future software implementation. Some embodiments access information such as login and authentication information from a portal such as a single sign-on portal to determine use status. The login and authentication information provides when and who is using specific software applications. Usage information may be derived from the use status and compared to parameters of the software application such as license numbers, vulnerabilities, resource allocations, etc. Actions may be taken to cure inefficiencies such as removing or disabling software applications at managed devices. Such actions may be automatically implemented based on the software usage or other relevant factors (e.g., other software parameters, employment status of a user, device characteristics, etc.).

Thus, embodiments described in the present disclosure provide a technical improvement to conventional IT support service systems. For instance, systems implementing embodiments of the present disclosure are able to capture use status information in a manage network of devices. The use status information may then be processed and analyzed. Based on derived values for software usage, the managed network may implement actions at managed devices to cure or mitigation inefficiencies (e.g., remove software applications, disable software applications, install additional software applications, etc.).

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

Figure 1:
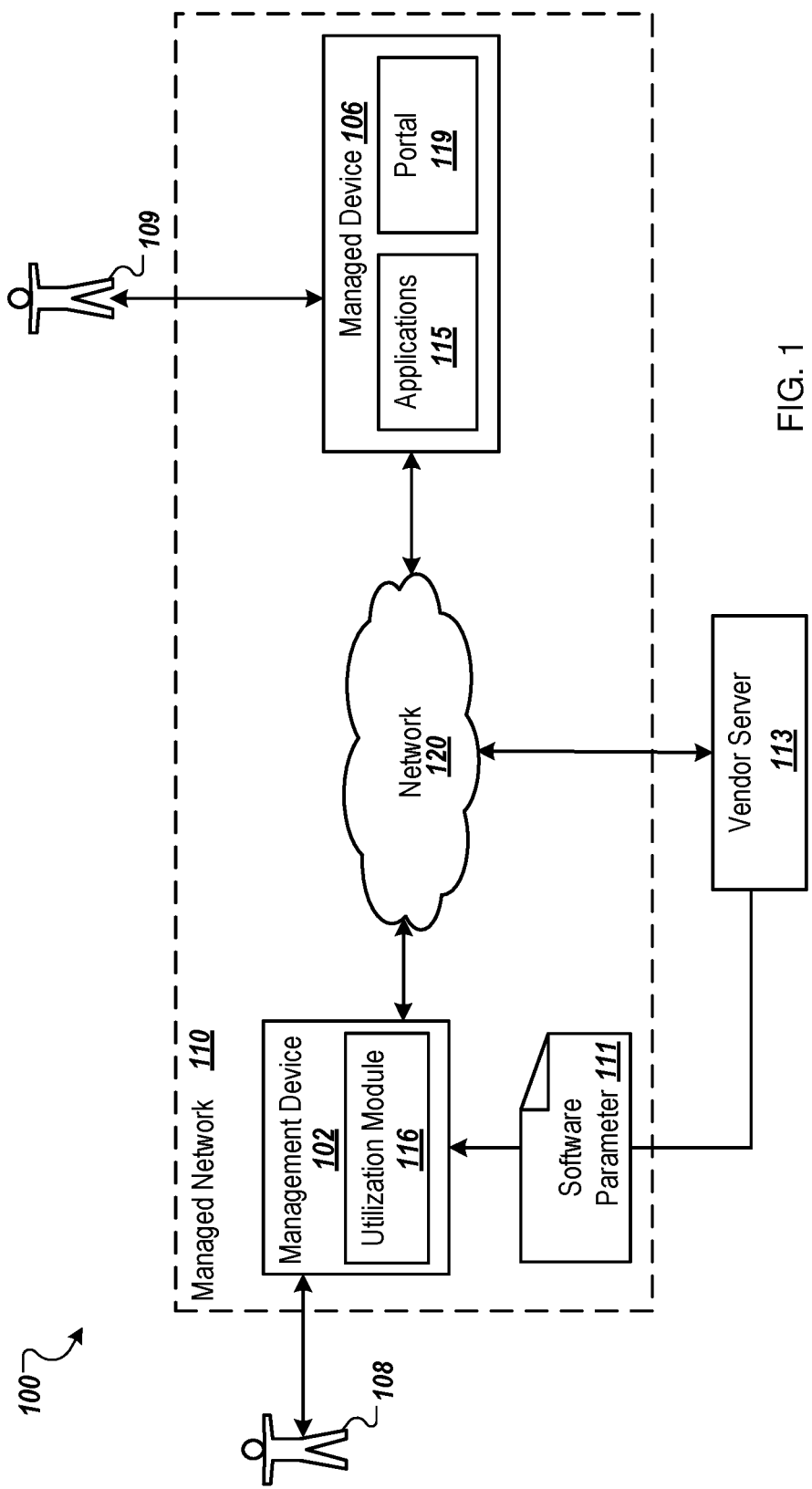
FIG. 1 depicts an example operating environment in which some embodiments of the present disclosure may be implemented.

FIG. 1 is a block diagram of an example operating environment 100 in which some embodiments of the present invention can be implemented. The operating environment 100 may be configured for implementation of software application management in a managed network 110. The software application management may enable optimization of the software applications distributed to and implemented on a managed device 106 of the managed network 110.

In the managed network 110, one or more software management operations are performed to analyze utilization of software applications or products (applications) 115 on the managed device 106. In some embodiments, a management device 102 may monitor usage of the applications 115 on a managed device 106. For example, the management device 102 may access login or authentication information of portals associated with the applications 115. Thus, the management device 102 has an indication of any time a user 109 logs into the applications 115. Based on the monitored usage, the management device 102 may determine whether and to what extent the applications 115 are being used. The applications 115 on the managed device 106 may accordingly be analyzed and optimized across a managed network 110.

Embodiments of the present disclosure provide a technical improvement to managed networks such as the managed network 110. For instance, in some conventional managed networks, use of the applications 115 is not known or monitored. This introduces inefficiencies into the managed network 110. More importantly, in conventional managed networks there is no technical means for the management device 102 to access usage information for analysis. Instead, in conventional systems, an administrator must log into several application-specific interfaces, which are hosted by an application vendor, to determine usage. This process is time consuming and may not focus on a particular user or a particular managed device. Moreover, the conventional systems often rely on administrators to identify inefficiencies and act on them.

Accordingly, embodiments described in the present disclosure provide a technical improvement to obtain use status and deriving usage information therefrom. The usage information may then be analyzed to gain efficiencies and trigger automated processes that automatically cure inefficiencies by altering an operational condition at the managed device 106. Additionally, embodiments of the present disclosure are directed to a computer-centric problem and are implemented in a computer-centric environment. For instance, the embodiments of the present disclosure are directed to application management in the managed network 110. Computing processes occurring in the operating environment 100 include communication and implementation of the applications 115 and computer-implemented instructions that modify which of the applications 115 remain on the managed device 106. Communications during the processes described in this present disclosure involve the communication of data in electronic and optical forms via a network 120 and also involve the electrical and optical interpretation of the data and information.

Furthermore, the embodiments of the present disclosure address a technical issue that exists in a technical environment. The technical issue includes an inability of conventional management systems to obtain the status of some or all of the applications 115 in the managed network 110 and to automate processes configured to cure or mitigate inefficiencies in the distribution of the applications 115.

The operating environment 100 may include the managed network 110 and a vendor server 113. The managed network 110 includes the management device 102 that may communicate with the vendor server 113 via the network 120. The components of the operating environment 100 are configured to communicate data and information via the network 120 to perform software application analysis management operations as described in the present disclosure. Each of these components are described below.

The network 120 may include any communication network configured for communication of signals between the components (e.g., 102, 113, and 106) of the operating environment 100. The network 120 may be wired or wireless. The network 120 may have configurations including a star configuration, a token ring configuration, or another suitable configuration. Furthermore, the network 120 may include a local area network (LAN), a wide area network (WAN) (e.g., the Internet), and/or other interconnected data paths across which multiple devices may communicate. In some embodiments, the network 120 may include a peer-to-peer network. The network 120 may also be coupled to or include portions of a telecommunications network that may enable communication of data in a variety of different communication protocols.

In some embodiments, the network 120 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 120 may include data communicated via short messaging service (SMS), multimedia messaging service (MMS), hypertext transfer protocol (HTTP), direct data connection, wireless application protocol (WAP), or any other protocol that may be implemented in the components of the operating environment 100.

The depicted embodiment of the operating environment 100 includes the vendor server 113. The vendor server 113 may be a hardware-based computer device configured to communicate data and information with the other components of the operating environment 100 via the network 120. The vendor server 113 may be associated with a software vendor that sells or develops one or more of the applications 115. An example of one of the applications 115 may be Microsoft 365®. In this example, the vendor server 113 may be a Microsoft® server.

The vendor server 113 may communicate or enable access to the software parameter 111. For instance, the administrator 108 may operate the management device 102 to access the software parameter 111 from the vendor server 113. In some implementations, the software parameter 111 might include a list of terms of a license contract for one or more of the applications 115. The list of terms may include a number of licenses purchased, an amount or cost of each license, a duration of the license, and the like. Additionally or alternatively, the software parameter 111 may include a computing resource requirement for one or more of the applications 115. Some examples of the computing resource requirement might include a bandwidth use, a storage capacity, a security setting or vulnerability, and the like.

In some embodiments, the operating environment 100 may not include the vendor server 113. In these embodiments, the management device 102 might directly consume the software parameter 111 from another source (e.g., from a public source) or the software parameter 111 may be manually entered.

Additionally, in some embodiments the management device 102 may include or be communicative coupled with one or more libraries from which the software parameter 111 may be determined. An example of a determination process is provided with reference to FIG. 3.

The managed network 110 includes the management device 102 and the managed device 106. The managed network 110 is implemented to enable management of the managed device 106 by the management device 102. To implement the managed network 110, the managed device 106 may be enrolled. After the managed device 106 is enrolled, ongoing management of the managed device 106 may be implemented by the management device 102. The ongoing management may include overseeing and dictating at least a part of the operations at the managed device 106 as well as dictate or control products and the applications 115 implemented at the managed device 106 as described in the present disclosure.

The management device 102 is configured to manage the applications 115 at the managed device 106. In general, management of the applications 115 may include obtaining use information of the applications 115 at the managed device 106, determining usage of the applications 115 based on the use information, optimizing the applications 115 at the managed device 106 and throughout the managed network 110, which may include adding and removing one or more of the applications 115 or otherwise modifying a state or condition of the managed device 106.

The managed device 106 may include hardware-based computer system that is configured to communicate with the other components of the operating environment 100 via the network 120. The managed device 106 may include any computer device that may be managed by the management device 102 and/or have been enrolled in the managed network 110. Generally, the managed device 106 includes a device that is operated by the personnel or system of an enterprise or stores data of the enterprise. The managed device 106 might include a workstation of an enterprise, a server, a data storage system, a printer, a telephone, an internet of things (IOT) device, a smart watch, a sensor, an automobile, a battery charging device, a scanner device, etc. The managed device 106 may also include a virtual machine, which may include a portion of a single processing unit or one or more portions of multiple processing units, which may be included in multiple machines. The managed device 106 may be referred to as managed endpoint when the managed device 106 is enrolled in the managed network 110.

The managed device 106 includes the applications 115. The applications 115 may include applications of any kind or type. Some examples of the applications 115 may include software applications, enterprise software, operating systems, hardware management programs, and the like.

The managed device 106 may be associated with a user 109. The user 109 is an individual or group of individuals who regularly or normally operate the managed device 106. For instance, the user 109 may own the manage device 106 and enroll the managed device 106 into the managed network 110. Additionally or alternatively, an enterprise may assign the managed device 106 to the user 109. In the depicted embodiment, there is one user 109 associated with one managed device 106. In some embodiments, the user 109 can be associated with multiple managed devices. The software management processes described in the present disclosure may be applied across multiple managed devices associated with the user 109.

The management device 102 may include hardware-based computer system that is configured to communicate with the other components of the operating environment 100 via the network 120. The management device 102 may be associated with the administrator 108. The administrator 108 may be an individual, a set of individuals, or a system that interfaces with the management device 102. In some embodiments, the administrator 108 may provide user input to the management device 102. The user input provided by the administrator 108 may form the basis of some computing processes performed by the management device 102. For example, the administrator 108 may provide user input at a user interface associated with the management device 102. The user input may indicate that the administrator 108 intends on distributing or implementing a subset of product updates. The user input may take the form of a selection of an icon or a button on a user interface displayed the management device 102.

The management device 102 may include a utilization module 116. The utilization module 116 may be configured for software application management in the managed network 110. For example, in some embodiments, the utilization module 116 may be configured to receive the software parameter 111. The software parameter 111 may be applicable to one or more of the applications 115 implemented by the managed device 106 in the managed network 110.

In some embodiments, the utilization module 116 may connect with the vendor server 113 or a software vendor site hosted by the vendor server 113. The utilization module 116 may access license information for the managed network 110 via the network 120. The license information may be used to determine the software parameter 111 of the applications 115.

Figure 2:
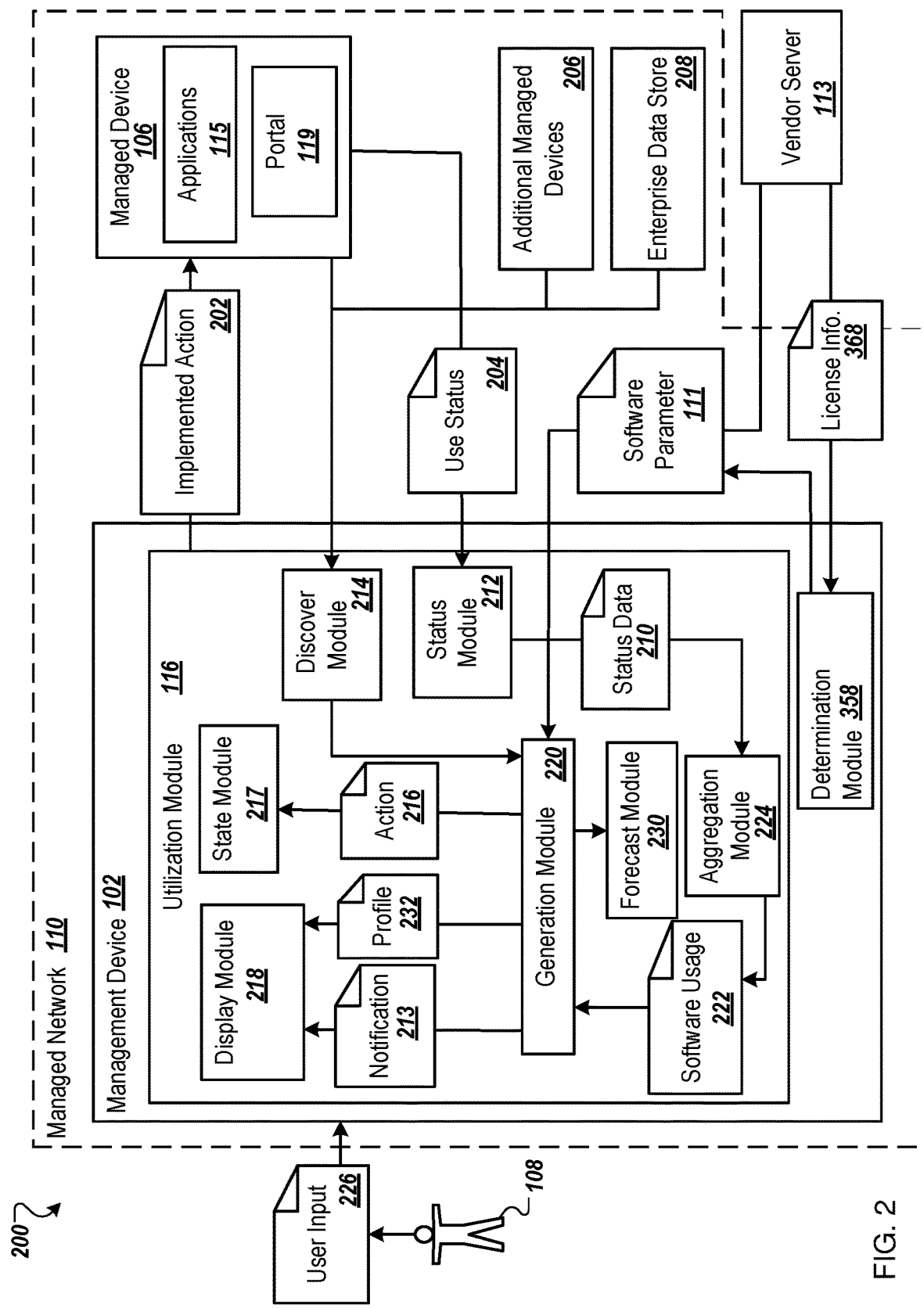
FIG. 2 is a block diagram of an example utilization/optimization process that may be implemented in the operating environment of FIG. 1.
Figure 3:
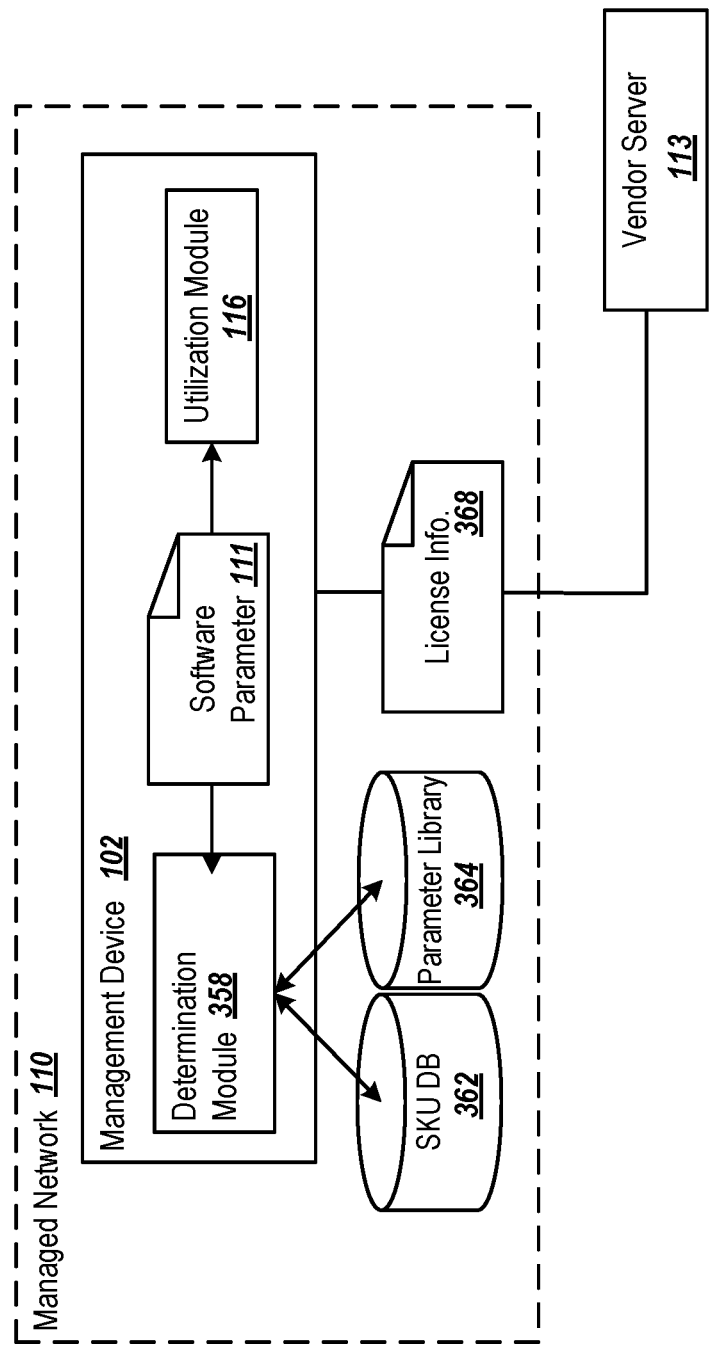
FIG. 3 depicts a software parameter determination process that may be implemented in the operating environment of FIG. 1.

For instance, referring to FIG. 3, a software parameter determination process (determination process) 300 is depicted in FIG. 3 that may be implemented in the operating environment 100 of FIG. 1 or another suitable environment. FIG. 3 includes some components (e.g., 110, 111, and 113) that are described with reference to FIGS. 1 and 2. These descriptions are not repeated with reference to FIG. 3. Additionally, the network 120 is omitted from FIG. 3. However, it may be understood with the benefit of this disclosure that communications of data and information and commands described in FIG. 3 may be via a computing network such as the network 120.

In the determination process 300, the vendor server 113 may be configured to communicate license information (in FIG. 3, License Info. 368) related to one or more applications (e.g., the applications 115 of FIG. 1). For instance, with combined reference to FIGS. 1 and 3, the application 115 may be purchased for implementation on the managed device 106. In a transaction to purchase the application 115, the vendor server 113 may communicate the license information 368 to the management device 102. The license information 368 includes information used to identify the application 115 such as versions, (stock keeping unit) SKU number, application name, language, country identifier, operating system, operating system compatibility, processor type, file size, release date, publisher, and the like.

In these and other embodiments, the management device 102 may include a determination module 358. The determination module 358 may be communicatively coupled with a SKU database (SKU DB in FIG. 3) 362 and a parameter library 364. The SKU database 362 may include a collection of SKUs. For instance, the SKU database 362 may include sets of SKUs associated with applications and third-party products such as products associated with the vendor server 113. The collection of SKUs may be automatically entered based on the license information 368 or may be manually entered into the SKU database 362.

The parameter library 364 may include one or more sets of software parameters, such as the software parameter 111. The software parameters in the parameter library 364 may be grouped or associated with one or more of the SKUs of the SKU database 362.

After receiving the license information 368, the determination module 358 may identify in the SKU database 362 a SKU associated with a particular application. In some circumstances, this identification may include a translation, version inquiry, and the like. For instance, the vendor server 113 may communicate the license information 368 for a foreign version of the application. The determination module 358 may receive the license information 368 and perform a translation operations to correlate the license information 368 with one of the SKUs of the SKU database 362.

In some embodiments, multiple applications may be correlated with a single SKU in the SKU database 362. For instance, all language versions of an application may be correlated with a single SKU. Similarly, some applications may have multiple versions (e.g., due to updating or modifying the application). These applications may be correlated with a single SKU.

After the license information 368 is correlated with a SKU in the SKU database 362, the determination module 358 may associate the SKU with one or more software parameters in the parameter library 364. The determination module 358 may access the software parameter 111 from the parameter library 364 and communicate the software parameter 111 to the utilization module 116. Accordingly, the utilization module 116 may receive the software parameter 111 from a determination module 358 or from the vendor server 113.

Referring back to FIG. 1, the software parameter 111 may be displayed or analyzed with software usage information of the applications 115. In some embodiments, the software parameter 111 includes one or more or a combination of a license term of the software, a cost element of the software, a computing resource requirement of the software, and a managed network preference related to the software. The utilization module 116 may discover one or more or all of the applications 115 operating on the managed network 110. For instance, to discover the applications 115 on the managed network 110 or the managed device 106, the utilization module 116 may access login information from the portal 119, which may be a SSO portal. The utilization module 116 may obtain status data of one or more of the applications 115 on the managed device 106. The status data indicate whether the applications 115 in use at the managed device 106 at a time. In some embodiments, to obtain the status data, the utilization module 116 may access login or authentication information of the portal 119. The status data may be obtained according to a defined schedule or responsive to a change in software configuration of the managed device 106. The utilization module 116 may aggregate the status data to determine a software usage of the applications 115 at the managed device 106. The utilization module 116 may compare the software usage to one or more usage thresholds. The usage thresholds may be based at least partially on the software parameter 111, such as a computing resource allocation or cost element. There may be multiple usage thresholds, which may enable the utilization module 116 to classify the software usage as "high," "medium," or "low" for instance. Alternatively, there may be a single usage threshold, which may determine whether the software usage is too low or too high to justify use of the managed network 110 or on the managed device 106.

In some implementations, the utilization module 116 may determine whether the software usage is below a particular usage threshold. Responsive to the software usage being below the particular usage threshold, the utilization module 116 may generate a software management action and/or a software management notification. The management action may include an operation initiated or controlled by the management device 102 and implemented locally on the managed device 102. In some embodiments, the management action includes remotely modifying at least one aspect of the managed device 106.

The software management notification may include some information that may be displayed on the management device 102. The software management notification may communicate an inefficiency or other relevant information regarding the software usage of the applications 115 at the managed device 106. An example of the software management notification may include a reclamation opportunity, whether the software usage is "high," "medium," or "low," and the like.

Implementation of the software management action may be based on whether a particular state exists at the management device 102. For instance, the management device 102 may require specific input from the administrator 108 such as selection of an icon or button to implement the software management action. Another example may include a selection of an automated implementation setting. The automated implementation setting may configure the utilization module 116 to automatically implement the software management action responsive to the software usage at or below a particular amount. For instance, responsive to the software usage being below one hour per month, the utilization module 116 may automatically remove or uninstall one of the applications 115 from the managed device 106.

In some embodiments, the utilization module 116 may obtain a list of users (e.g., the user 109) who operate one or more of the applications 115 on the managed network 110. The management device 102 may obtain usage data regarding some or all of the users. The management device 102 may filter or analyze the usage data. For instance, in some embodiments, the management device 102 may identify employment statuses of the users based on email address of the users.

Additionally, in some embodiments, the management device 102 may analyze software usage of each or a subset of the applications 115 at the managed device 106. The analyzed applications 115 may be associated with the user 109. The utilization module 116 may then generate a software usage profile of the user 109. The software usage profile may indicate usage of the applications 115 associated with the user 109. The software usage profile may further indicate a resource allocation to the user 109.

In some embodiments, the utilization module 116 may implement a forecast process based on the software usage information. In these and other embodiments, profile data related to the managed device 106 may be received. The profile data of the manage device 106 may include a role in an enterprise of the user 109 implementing the managed network 110, a particular process implemented by the managed device 106, a security setting of the managed device 106, a type of the managed device 106, acceptable locations of the managed device 106, other information, or combinations thereof. Based on the profile data and the software usage, the utilization module 116 may forecast a software implementation of an additional managed device having a similar profile data in the managed network 110.

Additionally, in some embodiments, the utilization module 116 may perform one or more additional forecast processes based on the software usage information. For instance, in these and other embodiments, the profile data may be related to the enterprise. The profile data may include one or more characteristics of an enterprise implementing the managed network 110. Based on the profile data and the software usage, a software implementation of an additional managed device may be forecasted. The additional managed device may be included in an additional managed network implemented by an additional enterprise, for instance. The forecasting may be based on a machine learning process or artificial intelligence. The machine learning process may be implemented based on the software parameter, the software usage, the profile data, a characteristic of the enterprise, a characteristic of the managed network, another suitable parameter, or combinations thereof.

The utilization module 116, the applications 115, and components thereof may be implemented using hardware including a processor, a microprocessor (e.g., to perform or control performance of one or more operations), a field-programmable gate array (FPGA), or an application-specific integrated circuit (ASIC). In some other instances, the utilization module 116, the applications 115, and components thereof may be implemented using a combination of hardware and software. Implementation in software may include rapid activation and deactivation of one or more transistors or transistor elements such as may be included in hardware of a computing system (e.g., the managed devices 106 or the management device 102 of FIG. 1). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more managed networks 110, one or more management devices 102, one or more managed devices 106, one or more vendor servers 107, or any combination thereof. Moreover, the separation of various components and devices in the embodiments described herein is not meant to indicate that the separation occurs in all embodiments. Moreover, it may be understood with the benefit of this disclosure that the described components and servers may generally be integrated together in a single component or server or separated into multiple components or servers.

FIG. 2 illustrates an example utilization/optimization process (process) 200 that may be implemented in the operating environment 100 of FIG. 1 or another suitable environment. The process 200 includes and have sub-processes performed by components (e.g., 102, 106, 104, etc.) introduced with respect to FIG. 1. Although not depicted in FIG. 2, communication of data and information may be via a network such as the network 120.

The process 200 may begin by the utilization module 116 receiving the software parameter 111. The software parameter 111 may be related to one or more of the applications 115 analyzed on the managed device 106. In some embodiments, the software parameter 111 may be communicated by or accessed from the vendor server 113 (as shown in FIG. 2). In some embodiments, the software parameter 111 may be accessed from a third-party source or may be manually entered by the administrator 108. In these and other embodiments, receiving the software parameter 111 may include connecting to the vendor server 113 and accessing license information for the managed network 110 from the vendor server 113.

Additionally or alternatively, as described elsewhere in the present disclosure, the software parameter 111 may be determined from license information 368, which may be communicated by the vendor server 113.

The software parameter 111 may be received by a generation module 220 of the utilization module 116. The software parameter 111 may be used to analyze software usage 222 of one or more of the applications 115. For instance, in some embodiments, the software parameter 111 may be used to generate usage thresholds for analysis of the software usage 222 or to categorize the software usage 222, the software parameter 111 may be used to determine inefficiencies (e.g., unused licenses), and the like.

A discover module 214 of the utilization module 116 may be configured to discover data and information related to the managed network 110. The discover module 214 may include sensors and or connectors that enable access to information in the managed network 110 and/or in other network locations in a cloud system hosting the managed network 110. For instance, the discover module 214 may be configured to discover the applications 115. In particular, the discover module 214 may implement a discovery process that accesses the managed device 106, additional managed devices 206 in the managed network 110 (or devices outside the managed network 110), enterprise data stores 208, other sources of data, or combinations thereof. The discover module 214 may accordingly have access to a list of the applications 115, a list of users in the managed network 110, information such as email address pertaining to the users, role, or profile information of the managed device 106 and/or the additional managed devices 206, profile information related to an enterprise operating the managed network 110, and the like.

In some embodiments, at least a portion of the information may be discovered from the portal 119. For instance, the discover module 214 may access the applications 115 operating on the managed network based on login information from the portal 119, which may be a single sign-on (SSO) portal as described above. The discover module 214 may communicate discovered information to the generation module 220 and/or a forecast module 230.

The utilization module 116 may include a status module 212. The status module 212 may be configured to obtain status data 210. For instance, the status module 212 may obtain a use status 204 of the applications 115 from the managed device 106 or another suitable source. The use status 204 may indicate whether the application is in use at the managed device 106 at a particular time. In some embodiments, the status module 212 may be configured to obtain status data 210 by accessing login or authentication information of the portal 119. The portal 119 may include a SSO portal. In other embodiments, the status module 212 may access log files that record application use, may access an agent on the managed device 106, or may otherwise obtain the use status 204. In some embodiments, the status module 212 may obtain the use status 204 according to a defined schedule (e.g., every hour, every twenty minutes, etc.) or may obtain the use status 204 responsive to a change in software configuration of the managed device 106.

The utilization module 116 may include an aggregation module 224. The aggregation module 224 may be configured to combine or aggregate the status data 210. Based on aggregated status data 210, the aggregation module 224 may determine a software usage 222 of one or more of the applications 115.

The generation module 220 may compare the software usage to one or more usage thresholds. The usage thresholds may be a threshold amount of time an application is used per month, a threshold number of workdays the application is used, a threshold amount of data generated using the application, other suitable thresholds, or combinations thereof. Also, the generation module 220 may compare the software usage 222 against multiple usage thresholds. The generation module 220 may characterize the software usage 222 based on the comparison. For instance, the generation module 220 may use two usage thresholds, a lower threshold, and a higher threshold. Responsive to the software usage 222 being below the lower threshold, the software usage 222 may be characterized as low. Responsive to the software usage 222 being between the lower threshold and the higher threshold, the software usage 222 may be characterized as medium. Responsive to the software usage 222 being above the higher threshold, the software usage 222 may be characterized as high. In some embodiments, one or more of the usage thresholds may be based at least partially on the software parameter 111.

Additionally, responsive to the software usage 222 being below one or more of the usage thresholds, the generation module 220 may generate a notification 213 and/or an action 216 that are related to software management in the managed network 110. The action 216 may be a process or operation that may be implemented by the utilization module 116 to modify a state of the managed device 106. The action 216 may be directed towards correcting an inefficiency or correcting a vulnerability that may be indicated by the software usage 222.

The notification 213 may be configured to provide insight and information to the administrator 108. For instance, the notification 213 may be communicated to the display module 218, which may communicate (e.g., visually, or audibly) it to the administrator 108. Some examples of the notification 213 may include a characterization of the software usage as low, medium, or high; a communication of a graph or plot of the resource allocation to the managed device 106 or a user of the managed device; a reclamation opportunity (e.g., due to low use) and the like.

The utilization module 116 may include a state module 217. The state module 217 may be configured to determine whether a particular state exists at the management device 102. The state may include a particular piece of user input 226 or a selection of an automated setting that implements the action 216 responsive to a set of conditions. For instance, responsive the software usage 222 being low for two consecutive months, the state module 217 may determine that a state exists to automatically implement an uninstall action. Additionally states may be over extended licenses, introduction of vulnerabilities due to application use, unbalanced computing resource allocation, etc. Responsive to the state at the management device 102, the state module 217 may be configured to implement the action 216. The action 216 may remotely modify at least one aspect of the managed device 106. For instance, the action 216 may remotely uninstall one of the applications 115 or prevent use of the applications 115 for a period of time.

In some embodiments, the generation module 220 may perform some additional operations. For instance, a list of users of the managed network 110 may be obtained by the discover module 214 and communicated to the generation module 220. The generation module 220 may process the list of users and characteristics of the users. The generation module 220 may identify a particular user as a current employee based on an email address, which may assist in management of the applications 115 in the managed network 110.

In some embodiments, the generation module 220 may be configured to generate a software usage profile (usage profile and in FIG. 2 "profile") 232. For example, the applications 115 may include two or more applications 115 that may be associated with the managed device 106 or a user of the managed device 106. The utilization module 116 may manage the two or more applications 115. Accordingly, the software usage 222 may be related to each of the two or more applications 115. The generation module 220 may generate the usage profile 232 that indicates usage of each of the two or more applications 115. The usage profile 232 may indicate a resource allocation to the managed device 106 and/or the user associated with the managed device 106. For instance, the usage profile 232 may visually depict each of the applications 115, the software usage 222 of each of the applications 115, a total computing resource allocation, a total financial resource allocation, a breakdown of time of use of each of the applications 115, other parameters, or combinations thereof.

The usage profile 232 may be communicated to the display module 218. The display module 218 may cause display of the usage profile 232 such that the administrator 108 can view it. The administrator 108 may provide the user input 226 to remotely change or implement an action to modify the state of the managed device 106. For instance, the administrator 108 may remotely uninstall or prevent access to one or more of the applications 115 based on the usage profile 232. Additionally or alternatively, the usage profile 232 may be used as an input to the state module 217. Based on one or more features of the usage profile 232, the utilization module 116 may generate and implement an action at the managed device 106.

Additionally, the usage profile 232 may be communicated to a forecast module 230, where it may be used to forecast software usage or software implementation as described below. The forecast module 230 may be configured to receive information related to the managed network 110 and to forecast software usage, software implementation, or potential software usage. For instance, the forecast module 230 may receive information from the generation module 220 and/or the discover module 214. Based on the information, the forecast module 230 may be configured to forecast information such as software usage (e.g., the software usage 222) or software implementation. For instance, the forecast module 230 may be configured to forecast software usage of one or more of the additional managed devices 206, the enterprise data store 208, another managed network, another managed network of another enterprise, another managed device in another managed network, another device or user, or combinations thereof. Correspondingly, the forecast module 230 may be configured to forecast software implementation at software usage of one or more of the additional managed devices 206, the enterprise data store 208, another managed network, another managed network of another enterprise, another managed device in another managed network, another device or user, or combinations thereof.

In some embodiments, the forecast module 230 may be configured to receive profile data. For instance, the profile data may be communicated from the discover module 214 or the generation module 220. The profile data may be related to the managed device 106, the managed network 110, an enterprise implementing the managed network 110, another system in a network, or combinations thereof. Additionally, the forecast module 230 may receive software usage data. The forecast module 230 may also receive data related to the software usage 222 from the generation module 220. Based on the profile data and the software usage 222, the forecast module 230 may forecast software implementation or software usage of a similar system (e.g., enterprise, device, network, etc.).

For example, the profile data may include a role of the user or the managed device 106 in an enterprise implementing the managed network 110. Based on the profile data and the software usage, the forecast module 230 may forecast a software implementation of one of the additional managed devices 206 having a similar profile data in the managed network 110.

In another example, the profile data may include one or more characteristics of the enterprise implementing the managed network 110. Based on the profile data and the software usage 222, the forecast module 230 may forecast software implementation or software usage of an additional enterprise that is similar to the enterprise hosting the managed network 110 or an additional managed device in an additional managed network implemented by an additional enterprise having a similar profile data. In some embodiments, the forecast module 230 may implement a machine learning process to forecast software usage. For machine learning process may be based on one or more or a combination of the software parameter, the software usage, the profile data, a characteristic of the enterprise, and a characteristic of the managed network.

Figure 4:
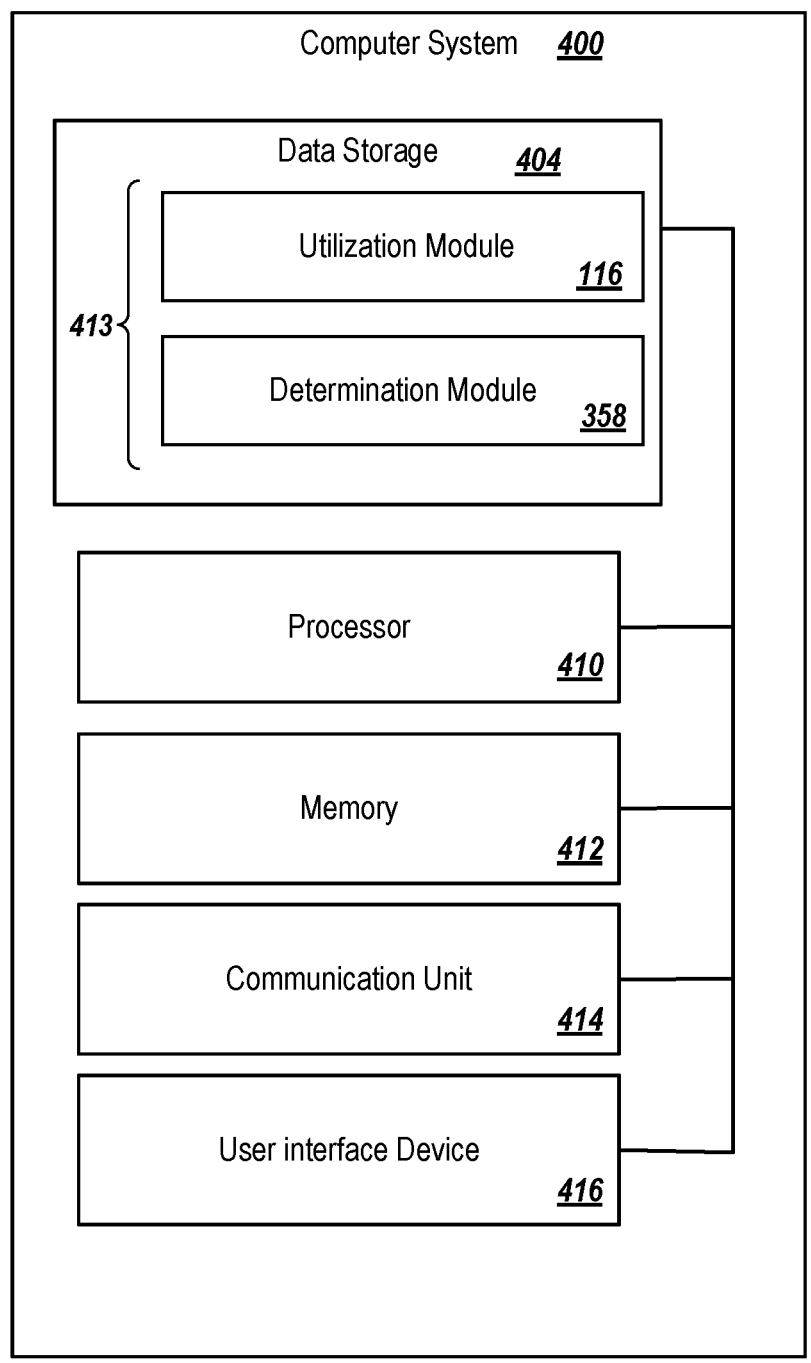
FIG. 4 illustrates an example computing system configured for software application utilization and optimization management.

FIG. 4 illustrates an example computer system 400 configured for automated product update analysis and management, according to at least one embodiment of the present disclosure. The computer system 400 may be implemented in the operating environment 100 of FIG. 1, for instance. Examples of the computer system 400 may include the management device 102, the managed device 106, the third-party server 104, or some combination thereof. The computer system 400 may include one or more processors 410, a memory 412, a communication unit 414, a user interface device 416, and a data storage 404 that includes the utilization module 116 and the determination module 358 (collectively, modules 413).

The processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an ASIC, an FPGA, or any other digital or analog circuitry configured to interpret and/or execute program instructions and/or to process data. Although illustrated as a single processor in FIG. 4, the processor 410 may more generally include any number of processors configured to perform individually or collectively any number of operations described in the present disclosure. Additionally, one or more of the processors 410 may be present on one or more different electronic devices or computing systems. In some embodiments, the processor 410 may interpret and/or execute program instructions and/or process data stored in the memory 412, the data storage 404, or the memory 412 and the data storage 404. In some embodiments, the processor 410 may fetch program instructions from the data storage 404 and load the program instructions in the memory 412. After the program instructions are loaded into the memory 412, the processor 410 may execute the program instructions.

The memory 412 and the data storage 404 may include computer-readable storage media for carrying or having computer-executable instructions or data structures stored thereon. Such computer-readable storage media may include any available media that may be accessed by a general-purpose or special-purpose computer, such as the processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 414 may include one or more pieces of hardware configured to receive and send communications. In some embodiments, the communication unit 414 may include one or more of an antenna, a wired port, and modulation/demodulation hardware, among other communication hardware devices. In particular, the communication unit 414 may be configured to receive a communication from outside the computer system 400 and to present the communication to the processor 410 or to send a communication from the processor 410 to another device or network (e.g., the network 120 of FIG. 1).

The user interface device 416 may include one or more pieces of hardware configured to receive input from and/or provide output to a user. In some embodiments, the user interface device 416 may include one or more of a speaker, a microphone, a display, a keyboard, a touch screen, or a holographic projection, among other hardware devices.

The modules 413 may include program instructions stored in the data storage 404. The processor 410 may be configured to load the modules 413 into the memory 412 and execute the modules 413. Alternatively, the processor 410 may execute the modules 413 line-by-line from the data storage 404 without loading them into the memory 412. When executing the modules 413, the processor 410 may be configured to perform one or more processes or operations described elsewhere in this disclosure.

Modifications, additions, or omissions may be made to the computer system 400 without departing from the scope of the present disclosure. For example, in some embodiments, the computer system 400 may not include the user interface device 416. In some embodiments, the different components of the computer system 400 may be physically separate and may be communicatively coupled via any suitable mechanism. For example, the data storage 404 may be part of a storage device that is separate from a device, which includes the processor 410, the memory 412, and the communication unit 414, that is communicatively coupled to the storage device. The embodiments described herein may include the use of a special-purpose or general-purpose computer including various computer hardware or software modules, as discussed in greater detail below.

Figure 5A:
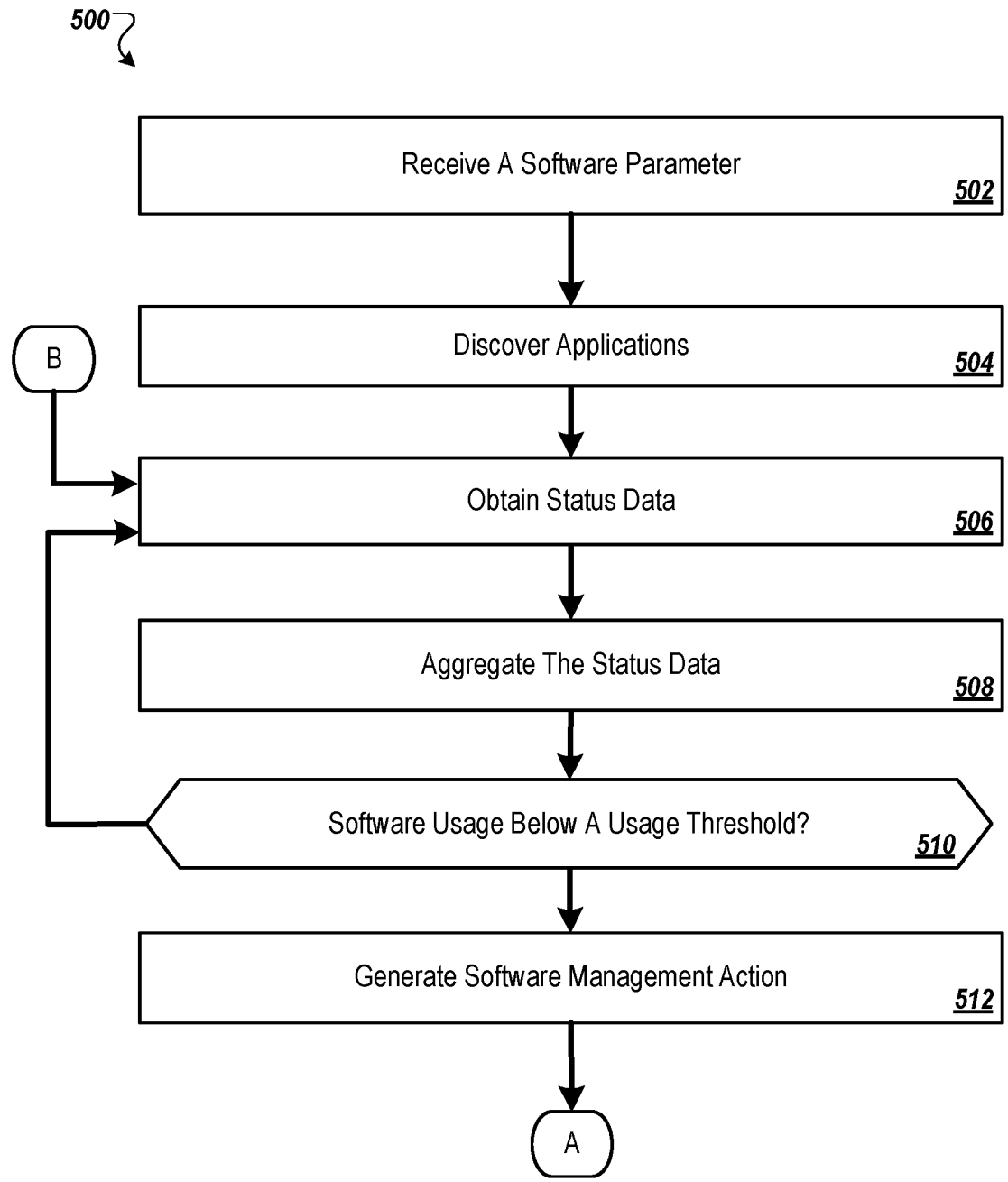
FIGS. 5A and 5B are a flowchart of an example method of software application utilization and optimization management in a managed network.
Figure 5B:
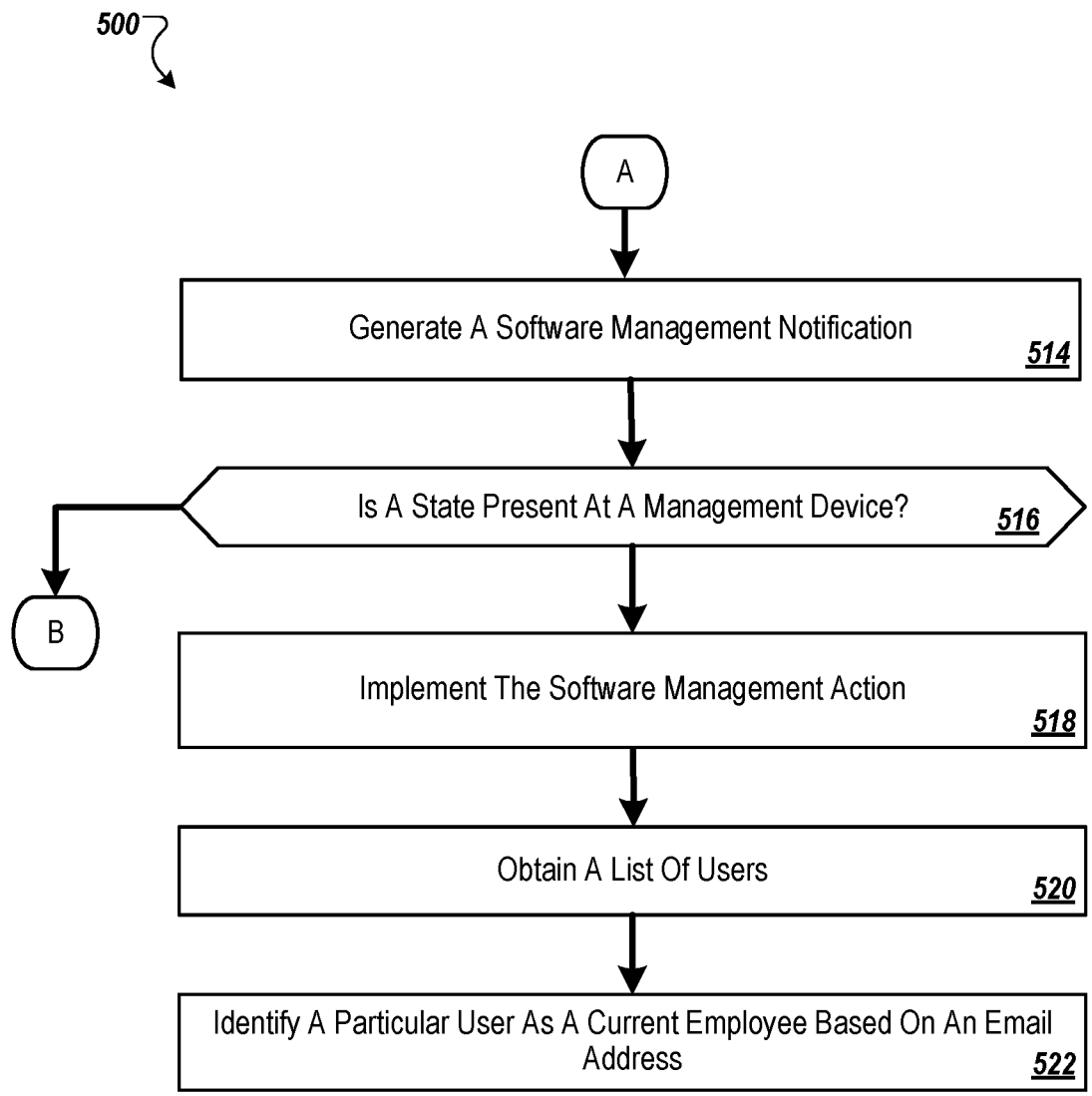

FIGS. 5A and 5B are a flow chart of an example method 500 of software utilization evaluation and optimization in a managed network, according to at least one embodiment of the present disclosure. Although illustrated as discrete blocks, one or more blocks in FIGS. 5A and 5B may be divided into additional blocks, combined into fewer blocks, or eliminated, depending on the desired implementation.

Referring to FIG. 5A, the method 500 may begin at block 502, in which a software parameter may be received. The software parameter may be related to a software that is implemented on a managed device or endpoint in a managed network. In some embodiments, receiving a software parameter may include two or more processes. For instance, receiving the software parameter may include accessing license information for one or more devices in the managed network. Accessing license information may include importing a license statement, manually entering the software parameter, another suitable data import process, or combinations thereof.

In some embodiments, the software parameter includes one or more or a combination of a license term of the software, a cost element of the software, a computing resource requirement of the software, and a managed network preference related to the software.

At block 504, one or more applications may be discovered. For example, the applications operating on the managed network may be discovered. Discovering the applications may include accessing data and information on a login portal. For instance, the discovering may include accessing login information from a single sign-on (SSO) portal (e.g., OKTA™).

At block 506, status data may be obtained. The status data may be related to the software on the device. For instance, the status data may indicate whether the software is in use at the device at a time. In some embodiments, the obtaining status data includes accessing login or authentication information, which may be obtained from a SSO portal or another suitable source. Additionally or alternatively, the status data may be accessed via an agent running on the managed device or another suitable process that enables visibility as to the applications in use at the managed device. Additionally, in some embodiments, the status data may be obtained periodically or responsive to events. For instance, the obtaining the status may be performed according to a defined schedule (e.g., every two hours, every day, every fifteen minutes, or another suitable interval), may be constantly monitored (e.g., performed as part of an ongoing process, which may be delayed or substantially real time), may be performed responsive to a change in software configuration of the managed device, or combinations thereof.

At block 508, the status data may be aggregated. The status data may be aggregated to determine a software usage of the software at the device. In some embodiments, aggregation of the status data may include combination of the status data for the device. The combined status data may also be compared against a standard usage or otherwise processed.

At block 510, it may be determined whether the software usage is below a particular threshold. In some embodiments, the usage threshold is based at least partially on the software parameter. The particular threshold may be an amount of usage time per month (or day or quarter), an amount of allocated resources (money or computing resources), an amount of data processed via the software, a particular output of the software, or another suitable threshold. Responsive to the software usage being above the usage threshold ("No" at block 510) the method 500 may precede to block 506. From block 506, the method 500 may proceed through one or more of the blocks (502, 504, 506, 508, 510, 512, 514, 516, 518, 520, 522, or combinations thereof) described with reference to FIGS. 5A and 5B.

Responsive to the software usage being below a usage threshold ("YES" at block 510) the method 500 may precede to block 512. At block 512, a software management action may be generated. The software management action may include an operation or process that modifies at least one aspect of the managed device. Some examples of the software management action may include removal of the software, removal of the software and installation of an updated version or substitute software, disabling the software, installing a separate or additional software, patching the software, or combinations thereof.

Referring to FIG. 5B, at block 514, a software management notification may be generated. The software management notification may be generated responsive to the software usage being below the particular threshold. In some embodiments, the software management notification may be indicative of a reclamation opportunity of the software. Additionally or alternatively, in some embodiments, the usage threshold may include a first threshold. In these and other embodiments, the reclamation opportunity may present the software usage relative to the first usage threshold and at least one additional usage threshold. In some instances, the software management notification may be associated with a level such as low, medium, and high with the software usage.

At block 516, it may be determined whether a particular state is present at a management device. The particular state may include a setting, a condition, or a state present at the management device. For instance, the state may include a permission granted by an administrator, a particular input at the administrator, a preference or setting at the management device, etc. In some instances, the state may be presentation of the reclamation opportunity and input sufficient the indicate that the reclamation opportunity is to be acted upon. Responsive to the state not being present ("NO" at block 510), the method 500 may precede to block 506. From block 506, the method 500 may proceed through one or more of the blocks (502, 504, 506, 508, 510, 512, 514, 516, 518, 520, 522, or combinations thereof) described with reference to FIGS. 5A and 5B.

Responsive to the state being present ("YES" at block 510) the method 500 may precede to block 518. At block 518, the software management action may be implemented. The software management action may be remotely implemented. Implementation of the software management action may modify at least one aspect of the managed device. In some embodiments, the state at the management device includes initiation of an automated software management process. In these and other embodiments, the software management action may include an automated uninstall of the software from the managed device.

At block 520, a list of users may be obtained. The list of user may include employees and non-employees who operate the software in the managed network. At block 522, a particular user may be identified as a current employee suitable enterprise-specific data associated with employees. For example, current employees may be identified based on an email address. Identification of the employees and non-employees may provide insight regarding software usage. For example, licenses might be allocated to former employees or independent contractors who have moved to another enterprise or project.

In some embodiments, the software is a first software of multiple software applications implemented in the managed network. In these and other embodiments, the method 500 may include associating the first software with a user of the managed device and further associating at least one additional software with the user that is installed at the managed device. Following the association of the first and additional software with the user, the method 500 may include generating a software usage profile of the user. The usage profile may indicate usage of the first software and the additional software. The software usage profile indicates a resource allocation to the user. In the managed network, multiple usage profiles may be generated for multiple users. Additionally, based on the received software parameters an overall utilization of the software may be determined and displayed. For instance, the software usage may be compared to a number of purchased licenses to determine over-deployment of under-utilization. Also, licenses may be transferred from a non-user or a former employee.

In some embodiments, the method 500 may include a forecast process based on the software usage information. In these and other embodiments, profile data related to the managed device may be received. The profile data of the manage device may include a role in an enterprise of a user implementing the managed network, a particular process implemented by the managed device, a security setting of the managed device, a type of managed device, acceptable locations of the managed device, other information, or combinations thereof. Based on the profile data and the software usage, the method 500 may include forecasting a software implementation of an additional managed device having a similar profile data in the managed network. For instance, if a first device implemented by a low-level a software engineer, then the software suitable for a second device implemented by another low-level software engineer in the enterprise may be similar. In some embodiments, the forecasting may be based on a machine learning process or artificial intelligence. The machine learning process may be implemented based on the software parameter, the software usage, the profile data, a characteristic of the enterprise, a characteristic of the managed network, another suitable parameter, or combinations thereof.

Additionally, in some embodiments, the method 500 may include another forecast process based on the software usage information. In these and other embodiments, profile data related to the enterprise may be received. The profile data may include one or more characteristics of an enterprise implementing the managed network. Based on the profile data and the software usage, a software implementation of an additional managed device may be forecasted. The additional managed device may be included in an additional managed network implemented by an additional enterprise, for instance. As above, in some embodiments, the forecasting may be based on a machine learning process or artificial intelligence. The machine learning process may be implemented based on the software parameter, the software usage, the profile data, a characteristic of the enterprise, a characteristic of the managed network, another suitable parameter, or combinations thereof.

Figure 6:
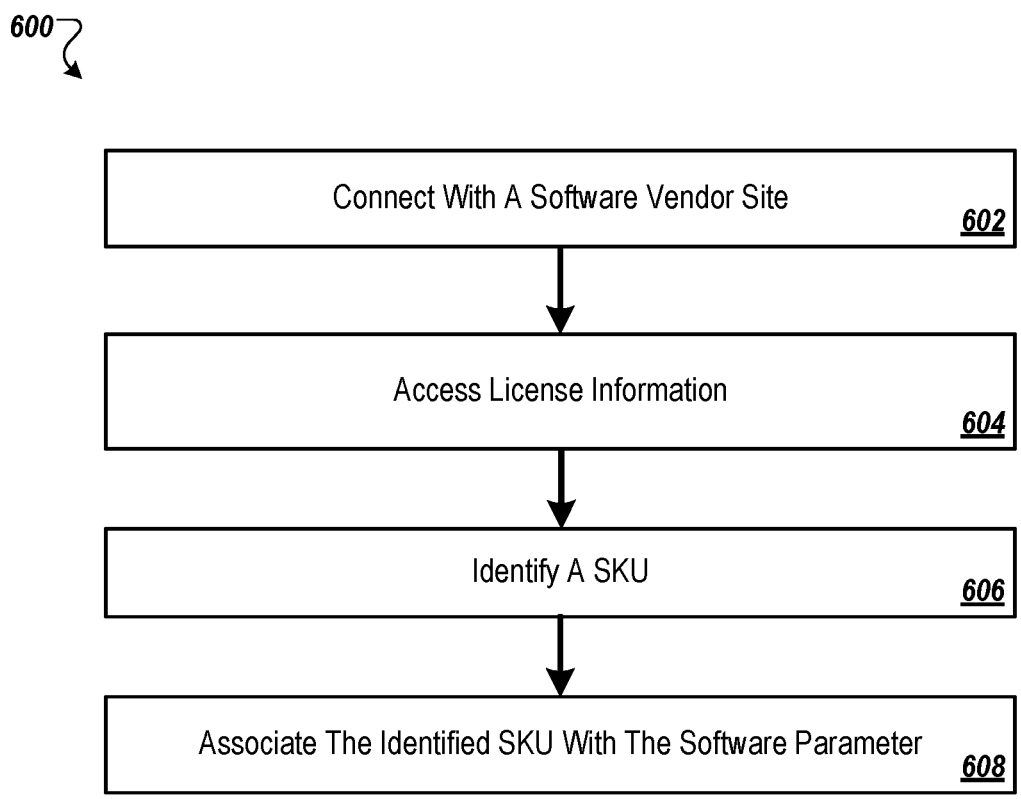
FIG. 6 is a flowchart of an example method of determining a software parameter, all according to at least one embodiment described in the present disclosure.

FIG. 6 is a flow chart of an example method 600 of determining a software parameter, according to at least one embodiment of the present disclosure. The method 600 may be implemented as a part or portion of another method. For instance, the method 600 may be included in the method 500 as part of or prior to the operation of block 502. Although illustrated as discrete blocks, one or more blocks in FIG. 6 may be divided into additional blocks, combined into fewer blocks, or eliminated, depending on the desired implementation.

The method 600 may begin at block 602 in which a software vendor site may be connected with. For instance, a connection may be initiated between a software vendor site via a network. With reference to FIGS. 1 and 2, the management device 102 may connect with the vendor server 113 via the network 120. At block 604, license information may be accessed. For instance, a vendor server may be configured to communicate license information related to one or more applications. The license information may include information used to identify the application such as versions, SKU number, application name, language, country identifier, operating system, operating system compatibility, processor type, file size, release date, publisher, and the like.

At block 606, a SKU may be identified. The SKU may be identified from data and information stored or included in a SKU database. In some embodiments, the identification may include a translation, version reconciliation, and the like. In some embodiments, multiple applications may be correlated with a single SKU in the SKU database. For instance, all language versions of an application or multiple versions of the application may be correlated with a single SKU.

At block 608, the identified SKU may be associated with the software parameter. For instance, the identified SKU may be associated with the software parameter based on information stored in a parameter library. The association of the SKU with the software parameter may enable a system such as a management device to determine the software parameter.

The methods 500 and 600 may be performed in a suitable operating environment such as the operating environment 100 or the managed network 110 of FIG. 1. The methods 500 and 600 may be performed by the management device 102 described elsewhere in the present disclosure or by another suitable computing system, such as the computer system 400 of FIG. 4. In some embodiments, the management device 102 or the other computing system may include or may be communicatively coupled to a non-transitory computer-readable medium (e.g., the memory 412 of FIG. 4) having stored thereon programming code or instructions that are executable by one or more processors (such as the processor 410 of FIG. 4) to cause a computing system or the management device 102 to perform or control performance of the methods 500 and 600. Additionally or alternatively, the management device 102 may include the processor 410 that is configured to execute computer instructions to cause the management device 102 or another computing systems to perform or control performance of the methods 500 and 600. The management device 102 or the computer system 400 implementing the methods 500 and 600 may be included in a cloud-based managed network, an on-premises system, or another suitable network computing environment.

Further, modifications, additions, or omissions may be made to the methods 500 and 600 without departing from the scope of the present disclosure. For example, the operations of methods 500 and 600 may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of software utilization evaluation in a managed network, the method comprising:
connecting with a software vendor site that sells or develops a software implemented by a managed device in the managed network;
accessing license information for the software;
determining a software parameter for the software based on the license information, wherein the software parameter includes a license term of the software, a cost element of the software, a computing resource requirement of the software, or a managed network preference related to the software;
receiving the software parameter for the software;
obtaining status data of the software on the managed device, the status data indicating whether the software is in use at the managed device at a particular time;
aggregating the status data to determine a software usage of the software at the managed device;
responsive to the software usage being below a usage threshold, generating a software management action, wherein the usage threshold is based at least partially on the software parameter, and wherein the software management action includes an automated uninstall of the software from the managed device; and
responsive to a state existing at a management device, implementing the software management action to remotely modify at least one aspect of the managed device, wherein the existing state at the management device includes initiation of an automated software management process.

2. The method of claim 1, wherein:
the software is a first software;
the method further comprises:
associating the first software with a user of the managed device;
further associating at least one additional software with the user that is installed at the managed device; and
generating a software usage profile of the user that indicates usage of the first software and the at least one additional software; and
the software usage profile indicates a resource allocation to the user.

3. The method of claim 1, further comprising responsive to the software usage being below the usage threshold, further generating a software management notification, wherein the software management notification is indicative of a reclamation opportunity of the software.

4. The method of claim 3, wherein:
the usage threshold includes a first usage threshold; and
the reclamation opportunity presents the software usage relative to the first usage threshold and at least one additional usage threshold.

5. The method of claim 1, wherein the obtaining the status data is performed according to a defined schedule or is performed responsive to a change in software configuration of the managed device.

6. The method of claim 1, further comprising:
receiving profile data related to one or both of the managed device or an enterprise, the profile data including a role in the enterprise implementing the managed network or a characteristic of the enterprise; and
based on the profile data and the software usage, forecasting a software implementation of an additional managed device having a similar profile data in the managed network or an additional managed network implemented by an additional enterprise,
wherein the forecasting is based on a machine learning process implemented based on one or more or a combination of the software parameter, the software usage, the profile data, a characteristic of the enterprise, and a characteristic of the managed network.

7. The method of claim 1, wherein:
the obtaining status data includes accessing login or authentication information of a single sign-on (SSO) portal, and
the method further comprises discovering a plurality of applications operating on the managed network based on the login or authentication information of the SSO portal.

8. The method of claim 1, further comprising:
identifying, in a stock keeping unit (SKU) database, a SKU associated with the software based on a correlation between the license information and the SKU; and
associating the identified SKU with the software parameter in a parameter library to determine the software parameter.

9. The method of claim 1, further comprising:
obtaining a list of users that operate the software on the managed network; and
identifying a particular user as an employee based on an employee email address.

10. One or more non-transitory computer-readable media storing one or more programs that are configured, in response to execution by one or more processors, to cause a system to execute or control execution of one or more of operations, the operations comprising:
connecting with a software vendor site that sells or develops a software implemented by a managed device in a managed network;
accessing license information for the software;
determining a software parameter for the software based on the license information, wherein the software parameter includes a license term of the software, a cost element of the software, a computing resource requirement of the software, or a managed network preference related to the software;
receiving the software parameter for the software;
obtaining status data of the software on the managed device, the status data indicating whether the software is in use at the managed device at a particular time;
aggregating the status data to determine a software usage of the software at the managed device;
responsive to the software usage being below a usage threshold, generating a software management action, wherein the usage threshold is based at least partially on the software parameter, and wherein the software management action includes an automated uninstall of the software from the managed device; and
responsive to a state existing at a management device, implementing the software management action to remotely modify at least one aspect of the managed device, wherein the existing state at the management device includes initiation of an automated software management process.

11. The non-transitory computer-readable media of claim 10, wherein:
the software is a first software;
the operations further comprise:
associating the first software with a user of the managed device;
further associating at least one additional software with the user that is installed at the managed device; and generating a software usage profile of the user that indicates usage of the first software and the at least one additional software; and the software usage profile indicates a resource allocation to the user.

12. The non-transitory computer-readable media of claim 10, wherein:
the operations further comprise responsive to the software usage being below the usage threshold, further generating a software management notification; and
the software management notification is indicative of a reclamation opportunity of the software.

13. The non-transitory computer-readable media of claim 12, wherein:
the usage threshold includes a first usage threshold; and
the reclamation opportunity presents the software usage relative to the first usage threshold and at least one additional usage threshold.

14. The non-transitory computer-readable media of claim 10, wherein the obtaining the status data is performed according to a defined schedule or is performed responsive to a change in software configuration of the managed device.

15. The non-transitory computer-readable media of claim 10, wherein:
the operations further comprise:
receiving profile data related to one or both of the managed device or an enterprise, the profile data including a role in the enterprise implementing the managed network or a characteristic of the enterprise; and
based on the profile data and the software usage, forecasting a software implementation of an additional managed device having a similar profile data in the managed network or an additional managed network implemented by an additional enterprise; and
the forecasting is based on a machine learning process implemented based on one or more or a combination of the software parameter, the software usage, the profile data, a characteristic of the enterprise, and a characteristic of the managed network.

16. The non-transitory computer-readable media of claim 10, wherein:
the obtaining status data includes accessing login or authentication information of a single sign-on (SSO) portal, and
the operations further comprise discovering a plurality of applications operating on the managed network based on the login or authentication information of the SSO portal.

17. The non-transitory computer-readable media of claim 10, wherein the operations further comprise:
identifying, in a stock keeping unit (SKU) database, a SKU associated with the software based on a correlation between the license information and the SKU; and
associating the identified SKU with the software parameter in a parameter library to determine the software parameter.

18. The non-transitory computer-readable media of claim 10, wherein the operations further comprise:
obtaining a list of users that operate the software on the managed network; and
identifying a particular user as an employee based on an employee email address.

* * * * *